(12) United States Patent
Xie

(10) Patent No.: US 10,984,795 B2
(45) Date of Patent: Apr. 20, 2021

(54) ELECTRONIC APPARATUS AND OPERATION METHOD THEREOF

(71) Applicant: SAMSUNG ELECTRONICS CO., LTD., Suwon-si (KR)

(72) Inventor: Hui Xie, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 115 days.

(21) Appl. No.: 16/382,712

(22) Filed: Apr. 12, 2019

(65) Prior Publication Data

US 2019/0341041 A1  Nov. 7, 2019

(30) Foreign Application Priority Data

Apr. 12, 2018 (CN) .......................... 201810324045.2
Mar. 27, 2019 (KR) ........................ 10-2019-0035388

(51) Int. Cl.
| | |
|---|---|
| *G10L 15/06* | (2013.01) |
| *G10L 15/22* | (2006.01) |
| *G10L 15/28* | (2013.01) |
| *G10L 15/14* | (2006.01) |

(52) U.S. Cl.
CPC ............ *G10L 15/22* (2013.01); *G10L 15/063* (2013.01); *G10L 15/14* (2013.01); *G10L 15/28* (2013.01); *G10L 2015/223* (2013.01)

(58) Field of Classification Search
CPC .............................. G10L 15/063; G10L 15/22
USPC ......................................................... 704/231
See application file for complete search history.

(56) References Cited

U.S. PATENT DOCUMENTS

| | | | |
|---|---|---|---|
| 7,548,651 B2 * | 6/2009 | Shozakai | ........... G06K 9/00335 382/209 |
| 8,438,026 B2 | 5/2013 | Fischer et al. | |
| 8,606,580 B2 * | 12/2013 | Shozakai | .............. G10L 15/144 704/251 |
| 8,630,391 B2 | 1/2014 | Fu et al. | |

(Continued)

FOREIGN PATENT DOCUMENTS

| | | |
|---|---|---|
| CN | 1905445 B | 2/2012 |
| CN | 101014997 B | 4/2012 |

(Continued)

OTHER PUBLICATIONS

Communication dated Mar. 10, 2020 from the State Intellectual Property Office of the P.R.China in application No. 201810324045.2.

*Primary Examiner* — Susan I McFadden
(74) *Attorney, Agent, or Firm* — Sughrue Mion, PLLC

(57) ABSTRACT

An electronic apparatus and an operation method thereof are provided. The method of an electronic apparatus includes obtaining first voice data and second voice data. The method includes allowing a background speaker model that is generated based on voice signals of a plurality of speakers to be trained based on the second voice data. The method includes determining whether the first voice data is voice data corresponding to a first registered speaker associated with the electronic apparatus. The method includes allowing a first registered speaker model that is configured to recognize a voice of the first registered speaker to be trained based on the first voice data and the background speaker model, based on determining that the first voice data is voice data corresponding to the first registered speaker.

16 Claims, 11 Drawing Sheets

(56) References Cited

U.S. PATENT DOCUMENTS

| | | | |
|---|---|---|---|
| 10,402,500 B2 * | 9/2019 | Chochowski | ............ G10L 17/00 |
| 10,636,417 B2 | 4/2020 | Park et al. | |
| 10,636,420 B2 * | 4/2020 | Kang | ...................... G10L 17/06 |
| 10,733,978 B2 * | 8/2020 | Subhojit | .................. G10L 17/02 |
| 10,778,830 B2 * | 9/2020 | Jang | ...................... H04L 67/025 |
| 2008/0255827 A1 | 10/2008 | Nurminen et al. | |
| 2011/0060592 A1 | 3/2011 | Kang et al. | |
| 2012/0101821 A1 | 4/2012 | Tsuda | |

FOREIGN PATENT DOCUMENTS

| | | |
|---|---|---|
| CN | 102543076 A | 7/2012 |
| CN | 103956169 A | 7/2014 |
| CN | 104008751 A | 8/2014 |
| CN | 104517587 A | 4/2015 |
| CN | 105814628 A | 7/2016 |
| CN | 105931644 A | 9/2016 |
| CN | 105976820 A | 9/2016 |
| JP | 2002196781 A | 7/2002 |
| JP | 4000828 B2 | 10/2007 |

\* cited by examiner

DISTRIBUTION OF GMM AND DISTRIBUTION OF
SPEAKER FOR WHICH TRAINING IS TO BE PERFORMED

DISTRIBUTION OF GMM MODEL AFTER APPLYING MAP

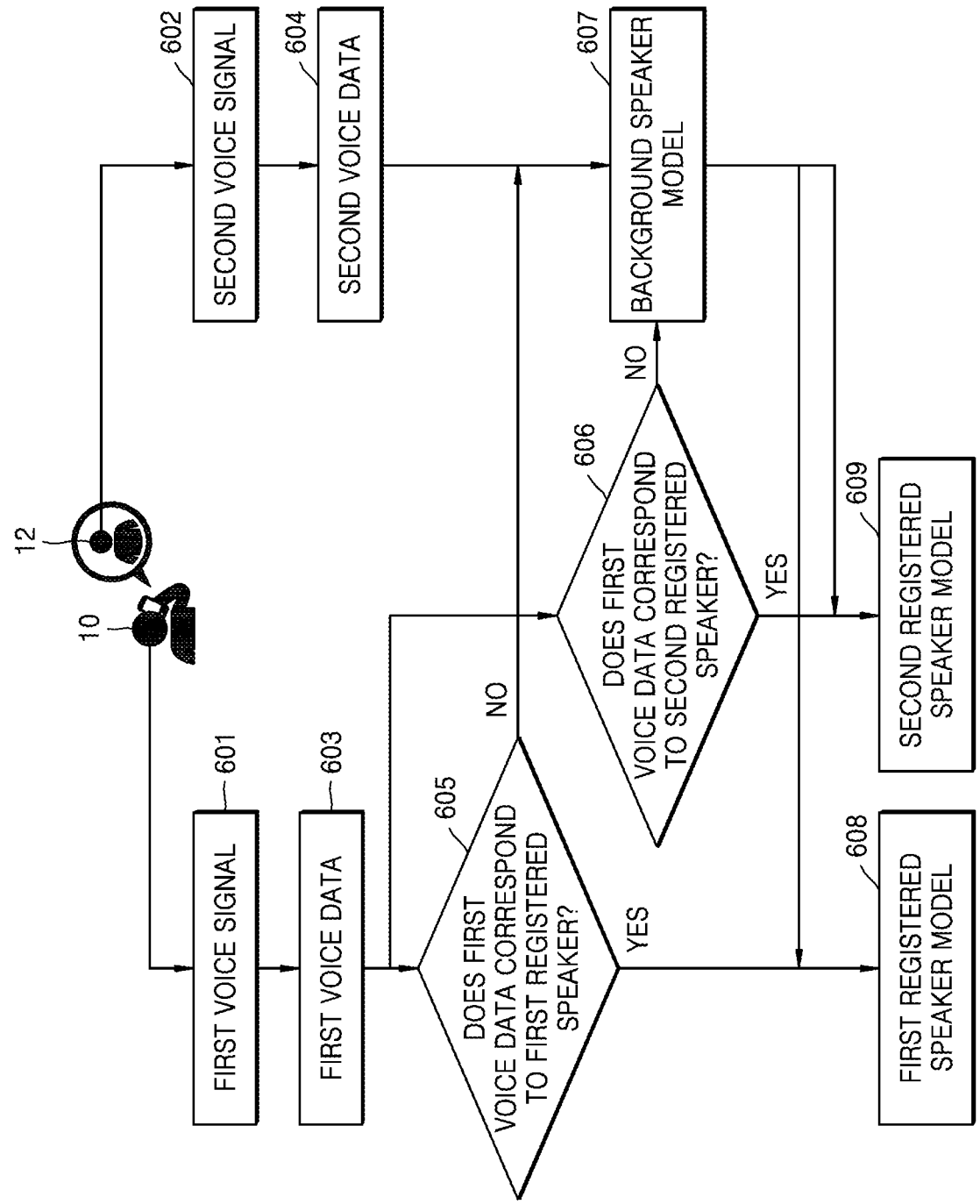

ELECTRONIC APPARATUS AND OPERATION METHOD THEREOF

CROSS-REFERENCE TO RELATED APPLICATION(S)

This application is based on and claims priority under 35 U.S.C. § 119 to Chinese Patent Application No. 201810324045.2, filed on Apr. 12, 2018, in the China National Intellectual Property Administration, and Korean Patent Application No. 10-2019-0035388, filed on Mar. 27, 2019, in the Korean Intellectual Property Office, the disclosures of which are incorporated herein by reference in their entireties.

BACKGROUND

1. Field

The disclosure relates to an electronic apparatus and an operation method of the electronic apparatus, and more particularly, to an electronic apparatus for obtaining voice data for training a voice recognition model and an operation method of the electronic apparatus.

2. Description of Related Art

Mobile intelligent terminal voice recognition is classified into two categories of semantic recognition and speaker recognition. Speaker recognition is generally referred to as voiceprint recognition and may be divided into two types of a text-dependent scheme and a text-independent scheme.

Text-dependent voice recognition requires a user to repetitively utter a fixed sentence two or three times to record associated function information which the user desires to register. In voice recognition, the user needs to utter the same fixed sentence.

Text-independent voice recognition does not require the user to utter a fixed sentence. When the user inputs a large quantity of voice data for machine learning, feature information of the user may be highly refined through training using a large quantity of data. Therefore, the user is not required to repetitively utter the same fixed sentence.

Because a mobile intelligent terminal according to the related art cannot identify the identity of a user and cannot identify voice features of different users, the same mobile intelligent terminal may provide the same voice command service to different users, and thus, security of user privacy may be low.

In a case of a voice assistant as an example, when an existing mobile intelligent terminal starts a voice assistant service, the existing mobile intelligent terminal is required to perform a fixed wake-up process. This process is a defect in text-dependent voice recognition, wherein a user needs to utter a fixed sentence to wake up a voice assistant, and the voice assistant cannot quickly respond to every voice instruction of the user.

That is, every voice command may be used after the wake-up process of the voice assistant is finished. Once a registered user wakes up the voice assistant by using the fixed sentence, a non-registered user may give a voice command. As described above, a method, performed by an existing voice assistant, of identifying a speaker is limited to identifying the speaker through the use of a fixed sentence based on text-dependent voice recognition.

To obtain highly refined user feature information and model parameters through training of a perfect learning model a large quantity of input voice data, text-independent voice recognition may use machine learning techniques.

Based on a learned speaker model, a user may achieve highly accurate speaker voice recognition through input of an arbitrary voice without regard to a fixed sentence.

However, to implement text-independent voice recognition in a mobile intelligent terminal, voice data of registered people and non-registered people are necessary. A user is required to invest a large amount of time and effort to input voice data, and obtaining voice data from non-registered users is impractical.

Because it is difficult to obtain high recognition accuracy without sufficient training data, existing mobile intelligent terminals do not generally use text-independent voice recognition.

SUMMARY

Provided is an electronic apparatus capable of reducing a user's burden of inputting voice data and improving user experience by using, for model training, voice data obtained through voice calls of the user and an operation method of the electronic apparatus.

Additional aspects will be set forth in part in the description which follows and, in part, will be apparent from the description, or may be realized by practice of the presented embodiments of the disclosure.

According to an embodiment of the disclosure, an operation method of an electronic apparatus includes: obtaining first voice data based on a first voice signal received via a first channel of an electronic apparatus; obtaining second voice data based on a second voice signal received via a second channel of the electronic apparatus; allowing a background speaker model that is generated based on voice signals of a plurality of speakers to be trained based on the second voice data; determining whether the first voice data is voice data corresponding to a first registered speaker associated with the electronic apparatus; and allowing a first registered speaker model that is configured to recognize a voice of the first registered speaker to be trained based on the first voice data and the background speaker model, based on determining that the first voice data is voice data corresponding to the first registered speaker.

According to another embodiment of the disclosure, an electronic apparatus includes: a memory configured to store one or more instructions; and a processor configured to execute the one or more instructions to: obtain first voice data based on a first voice signal received via a first channel; obtain second voice data based on a second voice signal received via a second channel; allow a background speaker model that is generated based on voice signals of a plurality of speakers to be trained based on the second voice data; determine whether the first voice data is voice data corresponding to a first registered speaker associated with the electronic apparatus; and allow a first registered speaker model that is configured to recognize a voice of the first registered speaker to be trained based on the first voice data and the background speaker model, based on determining that the first voice data is voice data corresponding to the first registered speaker.

According to another embodiment of the disclosure, a computer program product includes a recording medium having stored therein a program for: obtaining first voice data based on a first voice signal received via a first channel; obtaining second voice data based on a second voice signal received via a second channel; allowing a background speaker model that is generated based on voice signals of a plurality of speakers to be trained based on the second voice data; determining whether the first voice data is voice data corresponding to a first registered speaker; and allowing a first registered speaker model that is configured to recognize a voice of the first registered speaker to be trained based on the first voice data and the background speaker model, based on determining that the first voice data is voice data corresponding to the first registered speaker.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a flowchart of a second registered speaker model training method of an electronic apparatus, according to an embodiment;

DETAILED DESCRIPTION

Figure 1:
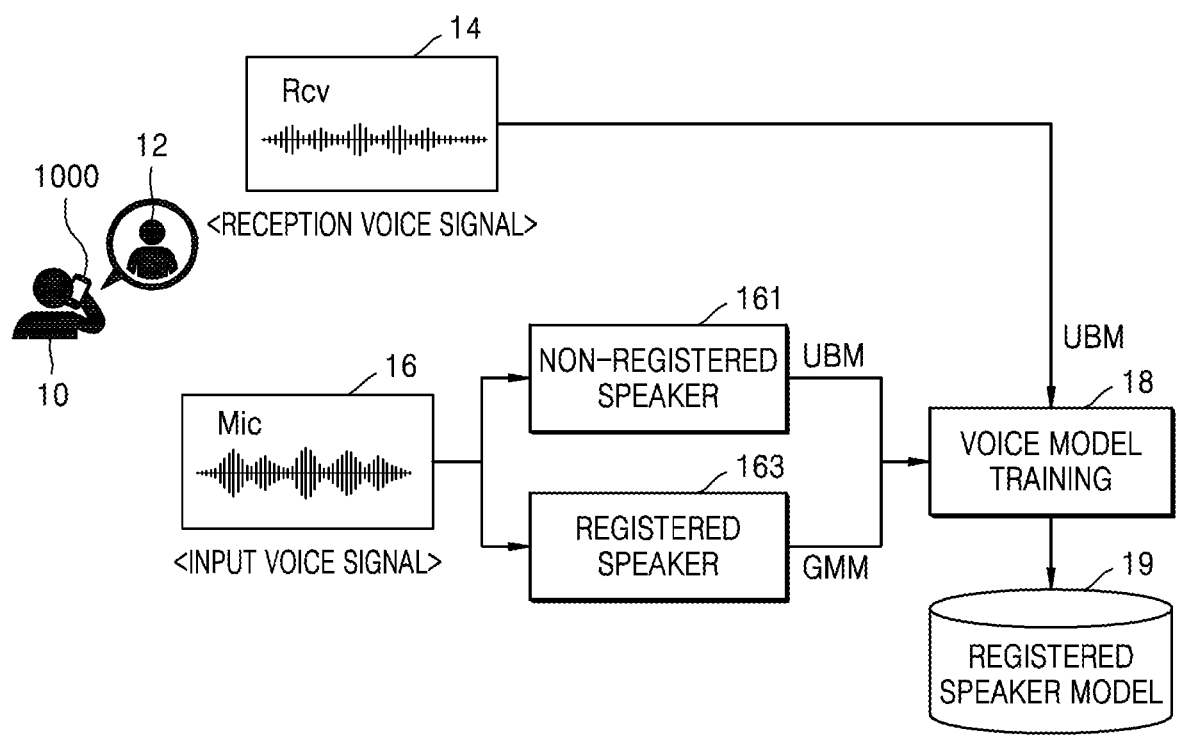
FIG. 1 illustrates a registered speaker model generation method according to an embodiment.

Hereinafter, embodiments of the disclosure will be described in detail with reference to the accompanying drawings. Like reference numerals in the drawings denote like elements.

Throughout the disclosure, the expression "at least one of a, b, or c" indicates only a, only b, only c, both a and b, both a and c, both b and c, all of a, b, and c, or variations thereof.

FIG. 1 illustrates a registered speaker model generation method according to an embodiment of the disclosure.

Referring to FIG. 1, an electronic apparatus 1000 according to an embodiment of the disclosure may receive an input of a voice signal from a user 10.

The electronic apparatus 1000 may be a terminal device usable by the user 10. The electronic apparatus 1000 may be a device capable of directly receiving an input of a voice signal of the user 10, such as, for example, a mobile phone, a smartphone, a smart TV, a smart audio device, a smart speaker, an artificial intelligence speaker, a personal computer (PC), a laptop computer, or a tablet PC, but is not necessarily limited thereto.

The electronic apparatus 1000 may determine whether the user 10 is a registered speaker or a non-registered speaker, based on an input voice signal 16 input from the user 10.

The electronic apparatus 1000 may allow a background speaker model corresponding to a plurality of speakers to be trained (operation 18) using a voice feature obtained from the input voice signal 16 based on determining (operation 161) that the user 10 is a non-registered speaker.

For a method of identifying a speaker, a method using a Gaussian mixture model (GMM) may be used. In order for a speaker recognition system using the GMM to have high accuracy, a large quantity of utterances for model training are necessary, and thus, a GMM-universal background model (UBM) scheme of generating a background speaker model in advance by using utterances of a plurality of speakers, and then performing adaptive training using a small number of utterances of a user is used.

Based on determining (operation 161) that the user 10 is a non-registered speaker, the electronic apparatus 1000 may allow the background speaker model corresponding to a plurality of speakers to be trained based on the input voice signal 16, and use the trained background speaker model for future adaptive training using a small number of utterances of the user 10. A registered speaker model of the user 10 may be generated and stored (operation 19) through the adaptive training techniques.

Based on determining (operation 163) that the user 10 is a registered speaker, the electronic apparatus 1000 may allow a voice model of the user 10 to be trained (operation 18) using the input voice signal 16 input from the user 10 and a pre-obtained background speaker model.

According to an embodiment of the disclosure, the electronic apparatus 1000 may receive a reception voice signal 14 from an external device. The reception voice signal 14 received from the external device may be, for example, a voice signal generated based on a voice of another person 12 to whom the user 10 is speaking to via the electronic apparatus 1000, but is not necessarily limited thereto.

The electronic apparatus 1000 may allow the background speaker model corresponding to the plurality of speakers to be trained (operation 18) based on the reception voice signal 14 received from the external device. That is, unlike the input voice signal 16, the electronic apparatus 1000 may use the reception voice signal 14 for training the background speaker model corresponding to the plurality of speakers without determining whether the reception voice signal 14 is a voice signal input from a registered speaker.

As described above, the electronic apparatus 1000 according to an embodiment of the disclosure may apply different types of voice processing techniques to voice signals received by the electronic apparatus 1000 via different channels to effectively classify voices of the user 10 and other people 12, or the like, and perform voice model training based on the classified voices.

Figure 2:
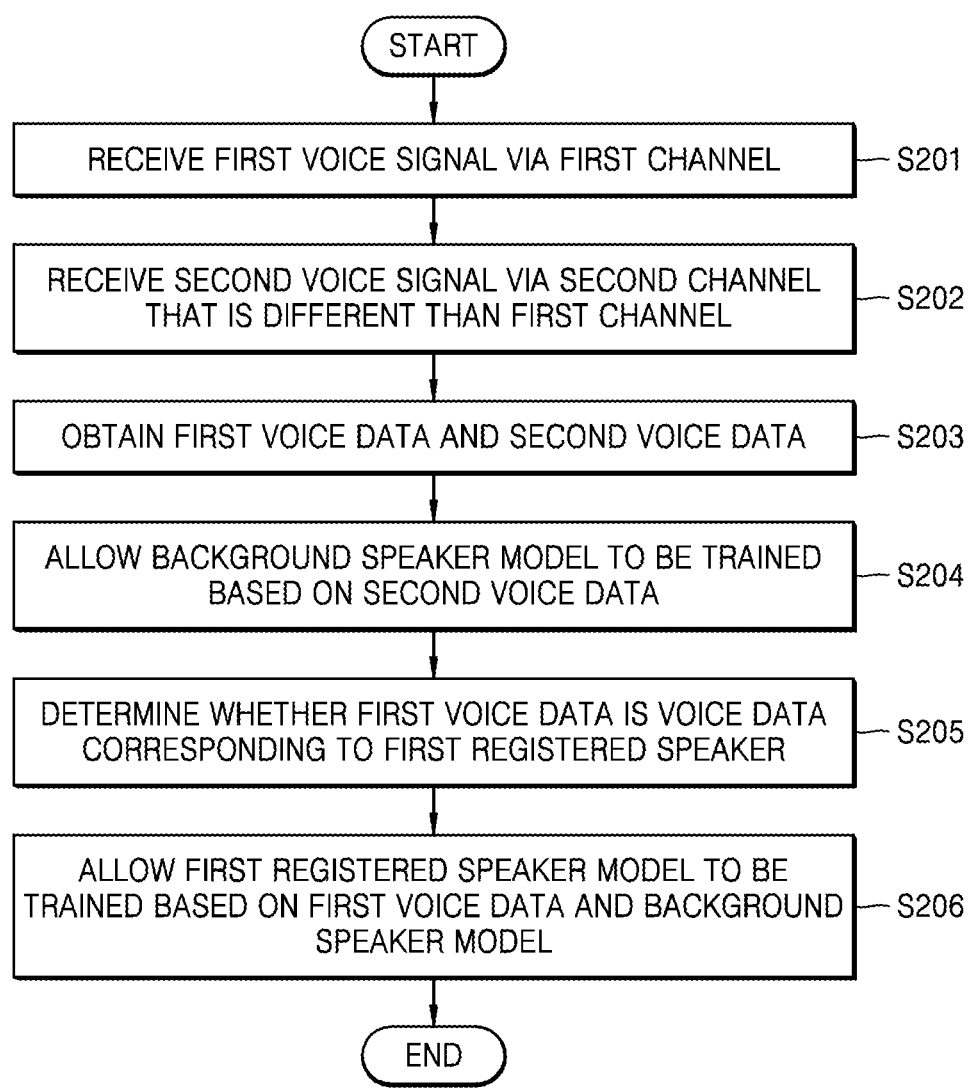
FIG. 2 is a flowchart of an operation method of an electronic apparatus, according to an embodiment.

FIG. 2 is a flowchart of an operation method of the electronic apparatus 1000, according to an embodiment of the disclosure.

In operation S201, the electronic apparatus 1000 may receive a first voice signal via a first channel. In operation S202, the electronic apparatus 1000 may receive a second voice signal via a second channel that is different than the first channel.

According to an embodiment of the disclosure, the user 10 may perform a voice call with another person 12 via the electronic apparatus 1000. Herein, the voice call may include an audio call and/or a video call such as a voice over Internet protocol (VoIP) call or a voice over long term evolution (VoLTE) call. For example, when the user 10 starts a voice call using the electronic apparatus 1000, the operation method of FIG. 2 may be triggered.

In operation S203, the electronic apparatus 1000 may obtain first voice data using the first voice signal, and obtain second voice data using the second voice signal.

A voice, i.e., a voice waveform, of the user 10 may be input to the electronic apparatus 1000 as an input voice signal based on the assumption that the voice of the user 10 has all pieces of information generated by a vocalization mechanism of the user 10. The electronic apparatus 1000 may use a subset of information fit for a voice recognition purpose among all the information included in the input voice signal. The subset of information fit for the voice recognition purpose may be extracted from the input voice signal by a statistical method.

As described above, information extracted from a voice signal to be used for a voice recognition system may be referred to as a voice feature. The voice feature may be extracted from a voice signal so as to include, for example, a plurality of components having different spectral distributions in a frequency domain.

The electronic apparatus 1000 may extract a feature vector as information by which unnecessarily duplicated voice information is removed, thereby increasing consistency between the same voice signals, and increasing discrimination capacity from other voice signals.

The feature vector may be extracted from a voice signal through, for example, a linear predictive coefficient method, a cepstrum method, a Mel frequency cepstral coefficient (MFCC) method, a filter bank energy method, or the like, but is not necessarily limited thereto.

The voice feature extracted by the electronic apparatus 1000 may be stored in a form of, for example, voice data and may be used for generation of a speaker model, registration of the speaker model, voice recognition of a speaker, and the like.

The electronic apparatus 1000 may determine, for example, whether the first voice data and the second voice data satisfy a preset speaker model learning condition.

The speaker model learning condition may include a condition of whether each of the first and second voice data is generated by a vocalization mechanism of a user. That is, the electronic apparatus 1000 may determine whether the first voice data and the second voice data include non-mute features.

When the first voice data and the second voice data do not include non-mute features, i.e., when it is determined that any voice by a speaker is not recorded in the first voice data and the second voice data, the electronic apparatus 1000 may determine that the first voice data and the second voice data do not satisfy the speaker model learning condition.

As a result of the determination, when the first voice data and the second voice data satisfy the preset speaker model learning condition, a voice data obtaining apparatus may proceed to operation S204.

According to an embodiment of the disclosure, voice cleaning of the first voice data and the second voice data may be selectively further performed after operation S203 and before operation S204. Because the voice cleaning may include de-noising, noise reduction, and the like, quality of the first voice data and the second voice data may be improved, and thus, the quality of speaker model training may also be improved.

According to an embodiment of the disclosure, when the electronic apparatus 1000 corresponds to a mobile intelligent terminal, operation S203 may include storing voice data and may be set by a hardware device operating layer in an operating system of the electronic apparatus 1000.

When the user 10 starts a voice call through an application of the electronic apparatus 1000, the electronic apparatus 1000 may receive and store real-time input voice data in the hardware device operating layer of the electronic apparatus 1000. In this case, an input voice signal to a microphone of the electronic apparatus 1000 corresponds to voice data of the user 10 of the mobile intelligent terminal, i.e., the electronic apparatus 1000. In addition, a reception voice signal received via a communication interface of the electronic apparatus 1000 corresponds to voice data of another person associated with the voice call.

In operation S204, the electronic apparatus 1000 may allow a background speaker model generated based on voice signals of a plurality of speakers to be trained based on the second voice data.

The electronic apparatus 1000 may, for example, classify the second voice data to be used for training of the background speaker model as background speaker model training data and store the background speaker model training data in a memory of the electronic apparatus 1000.

The background speaker model is a GMM generated by collecting voice signals of various speakers and then applying an expectation maximization algorithm (hereinafter, referred to as EM algorithm) to voice features corresponding to the collected voice signals.

In operation S205, the electronic apparatus 1000 may determine whether the first voice data is voice data corresponding to a first registered speaker associated with the electronic apparatus 1000.

In operation S206, based on determining that the first voice data is voice data corresponding to the first registered speaker, the electronic apparatus 1000 may allow a first registered speaker model that is configured to recognize a voice of the first registered speaker to be trained based on the first voice data and the background speaker model.

The electronic apparatus 1000 may, for example, classify the first voice data to be used for training of the first registered speaker model as first registered speaker model training data and store the first registered speaker model training data in the memory of the electronic apparatus 1000.

The electronic apparatus 1000 may, for example, extract a feature vector from the first voice data for training the first registered speaker model, and use a maximum a posteriori (MAP) adaptation algorithm based on the extracted feature vector and the background speaker model. A detailed method of allowing a registered speaker model to be trained based on voice data and the background speaker model will be described in detail with reference to FIGS. 4, 5A, and 5B.

A voice feature value extraction technique of a neural network voice recognition model requires a previous input of a large quantity of voice data to obtain a voice feature of a speaker. An existing method enables a user to input voice data for model training using a particular program, and the user may be required to spend a large amount of time to perform personal voice function learning.

According to an embodiment of the disclosure, the user 10 may provide, via the electronic apparatus 1000, instant voice data generated during routine usage of the electronic apparatus 1000, and the electronic apparatus 1000 may utilize the collected voice data for training of a voice recognition model, thereby enabling recognition accuracy of the voice recognition model to be continuously improved.

Compared with the related art, because a user of a training method of the disclosure is not required to perform a tedious and complicated process of inputting training voice data, the burden of the user may be reduced, and user experience may be improved.

In addition, the training method of the disclosure may enable accumulation of voice data for text-independent voice recognition to be implemented on a mobile intelligent terminal, and enable the mobile intelligent terminal to more intelligently understand a feature of each user than as compared to existing text-dependent voice recognition techniques.

When a text-independent voice recognition function is added to a voice assistant, security may be reinforced by identifying the identity of a user and processing a voice instruction to be applied to the voice recognition model.

The electronic apparatus 1000 may remove the first voice data and the second voice data after the training ends to avoid consumption of device resources and compromise of user privacy, and then, the method of FIG. 2 may end. Alternatively, when the training of the voice recognition model ends, relevant voice data is removed, and the method of FIG. 2 may end.

Figure 3:
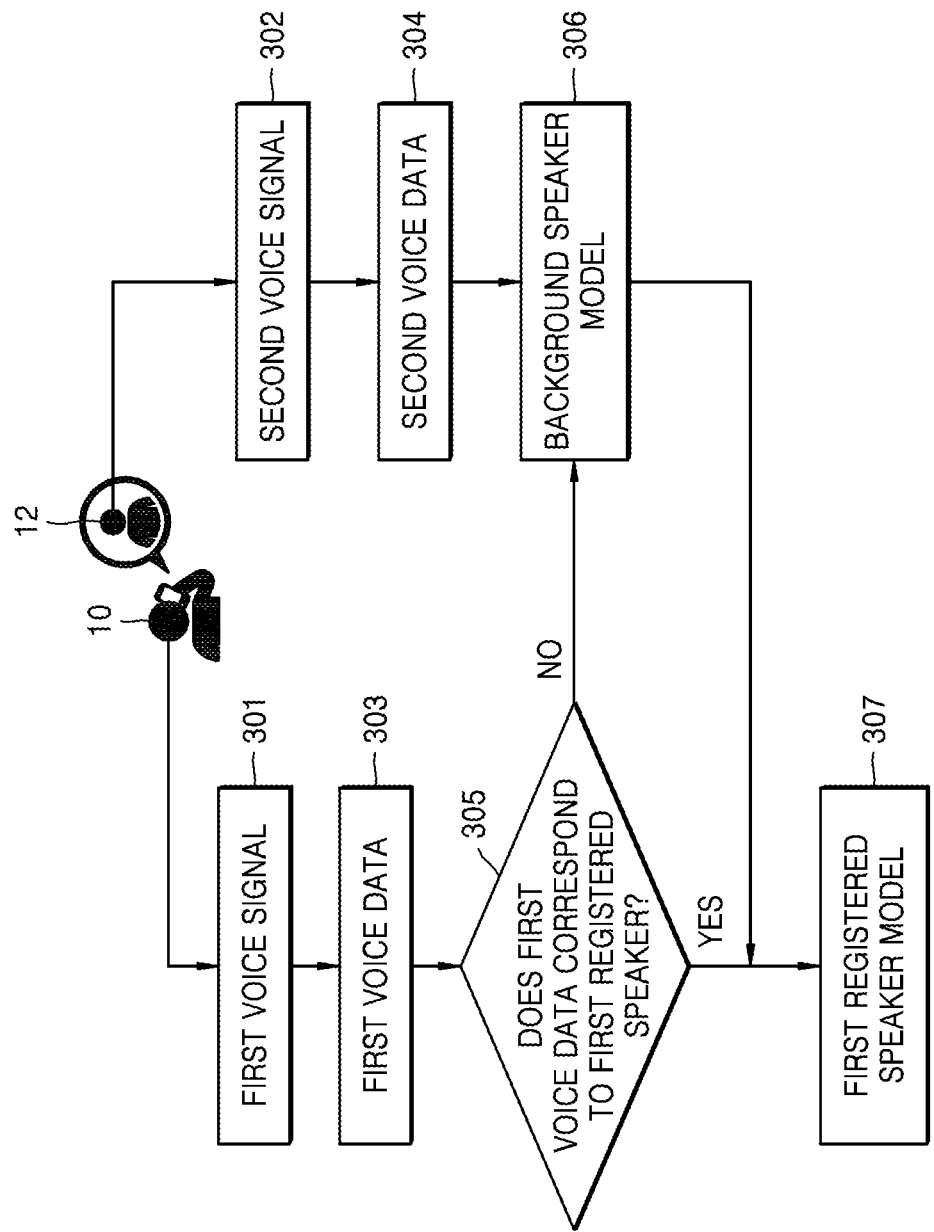
FIG. 3 is a flowchart of a first registered speaker model training method of an electronic apparatus, according to an embodiment.

FIG. 3 is a flowchart of a first registered speaker model training method of the electronic apparatus 1000, according to an embodiment of the disclosure.

Referring to FIG. 3, according to an embodiment of the disclosure, the electronic apparatus 1000 may receive an input of a first voice signal 301 from the user 10, and obtain first voice data 303 from the input first voice signal 301.

In addition, the electronic apparatus 1000 may receive a second voice signal 302 based on a voice of another person 1,2 to whom the user 10 is speaking, from an external device and obtain second voice data 304 from the received second voice signal 302.

The electronic apparatus 1000 may allow a background speaker model 306 generated based on voice signals of a plurality of speakers to be trained using the obtained second voice data 304.

The electronic apparatus 1000 may determine (operation 305) whether the obtained first voice data 303 is voice data corresponding to a first registered speaker associated with the electronic apparatus 1000. A registered speaker may refer to a user that is associated with the electronic apparatus 1000. As examples, a registered speaker may refer to a person that is an owner of the apparatus 1000, that is registered to use the electronic apparatus 1000, that includes an account associated with the electronic apparatus 1000, that is authorized to use the electronic apparatus 1000, that is licensed to use the electronic apparatus 1000, that includes a permission to use the electronic apparatus 1000, that is authenticated to use the electronic apparatus 1000, and/or the like.

The electronic apparatus 1000 may determine (operation 305) whether the first voice data 303 is voice data corresponding to the first registered speaker associated with the electronic apparatus 1000, by, for example, receiving separate data for authentication from the user 10.

The electronic apparatus 1000 may determine (operation 305) whether the first voice data 303 is voice data corresponding to the first registered speaker, based on, for example, facial recognition based on an image captured through a camera, fingerprint recognition using a fingerprint recognition sensor, other types of biometric identification techniques, and/or the like.

With respect to the determination based on the facial recognition, the electronic apparatus 1000 may obtain and store in advance a facial image of the first registered speaker.

The user 10 may authenticate that the user 10 is a user who has inputted the first voice signal 301 corresponding to the first voice data 303 by, for example, inputting a facial image of the user 10 via a camera included in the electronic apparatus 1000 as, or before, the first voice signal 301 is input.

The user 10 may authenticate that the user 10 is a user who has inputted the first voice signal 301 corresponding to the first voice data 303 by, as another example, inputting the first voice signal 301 into the electronic apparatus 1000 and then inputting a facial image of the user 10 via the camera included in the electronic apparatus 1000 in response to a facial image input request displayed on a screen of the electronic apparatus 1000.

With respect to the determination based on the fingerprint recognition, the electronic apparatus 1000 may store in advance fingerprint data obtained from the first registered speaker.

The user 10 may authenticate that the user 10 is a user who has inputted the first voice signal 301 corresponding to the first voice data 303 by, for example, inputting fingerprint data of the user 10 via a fingerprint recognition sensor included in the electronic apparatus 1000 as, or before, the first voice signal 301 is input.

The user 10 may authenticate that the user 10 is a user who has inputted the first voice signal 301 corresponding to the first voice data 303 by, as another example, inputting the first voice signal 301 into the electronic apparatus 1000 and then inputting fingerprint data of the user 10 via the fingerprint recognition sensor included in the electronic apparatus 1000 in response to a fingerprint data request displayed on the screen of the electronic apparatus 1000.

Based on determining that the first voice data 303 is voice data corresponding to the first registered speaker associated with the electronic apparatus 1000, the electronic apparatus 1000 may allow a first registered speaker model 307 to be trained using the first voice data 303 and the background speaker model 306.

Alternatively, and based on determining that the first voice data 303 is not voice data corresponding to the first registered speaker associated with the electronic apparatus 1000, the electronic apparatus 1000 may allow the background speaker model 306 generated based on the voice signals of the plurality of speakers to be trained using the first voice data 303 in the same manner as in the case of the second voice data 304.

The electronic apparatus 1000 may determine (operation 305) whether the first voice data 303 is voice data corresponding to the first registered speaker, by, as another example, performing voice recognition based on a preset first registered speaker model. That is, the electronic apparatus 1000 may use a voice recognition model for user authentication without performing the user authentication using facial recognition or fingerprint recognition. However, because this authentication has a large determination error when considering initial training of the voice recognition model, manual identity authentication of a user may be complementarily performed.

The electronic apparatus 1000 may receive a speaker registration voice signal generated through utterance of a preset sentence and pre-register the first registered speaker model 307 using the received speaker registration voice signal, to perform, for example, voice recognition based on a preset first registered speaker model. In this case, as a result of the determination 305, when the first voice data 303 is voice data corresponding to the first registered speaker associated with the electronic apparatus 1000, the electronic apparatus 1000 may update the preset first registered speaker model using the first voice data 303 and the background speaker model 306 and generate a new first registered speaker model 307 (or re-train an existing model).

The electronic apparatus 1000 may perform user authentication, for example, using a facial recognition, fingerprint recognition, a biometric identification technique, a user authentication method using a user voice recognition model, and/or the like.

The electronic apparatus 1000 may perform the user authentication by, for example, simultaneously or sequentially performing the user authentication method using the facial recognition or fingerprint recognition described above and the user authentication method using a user voice recognition model. However, the electronic apparatus 1000 may perform user authentication using any authentication method capable of determining whether the first voice data 303 is voice data corresponding to the first registered speaker As described above, the electronic apparatus 1000 according to an embodiment of the disclosure may more efficiently collect voice data for background speaker model training using voice data obtained via a first channel for the background speaker model training when it is determined that the obtained voice data is voice data of a user that is not a registered speaker.

Figure 4:
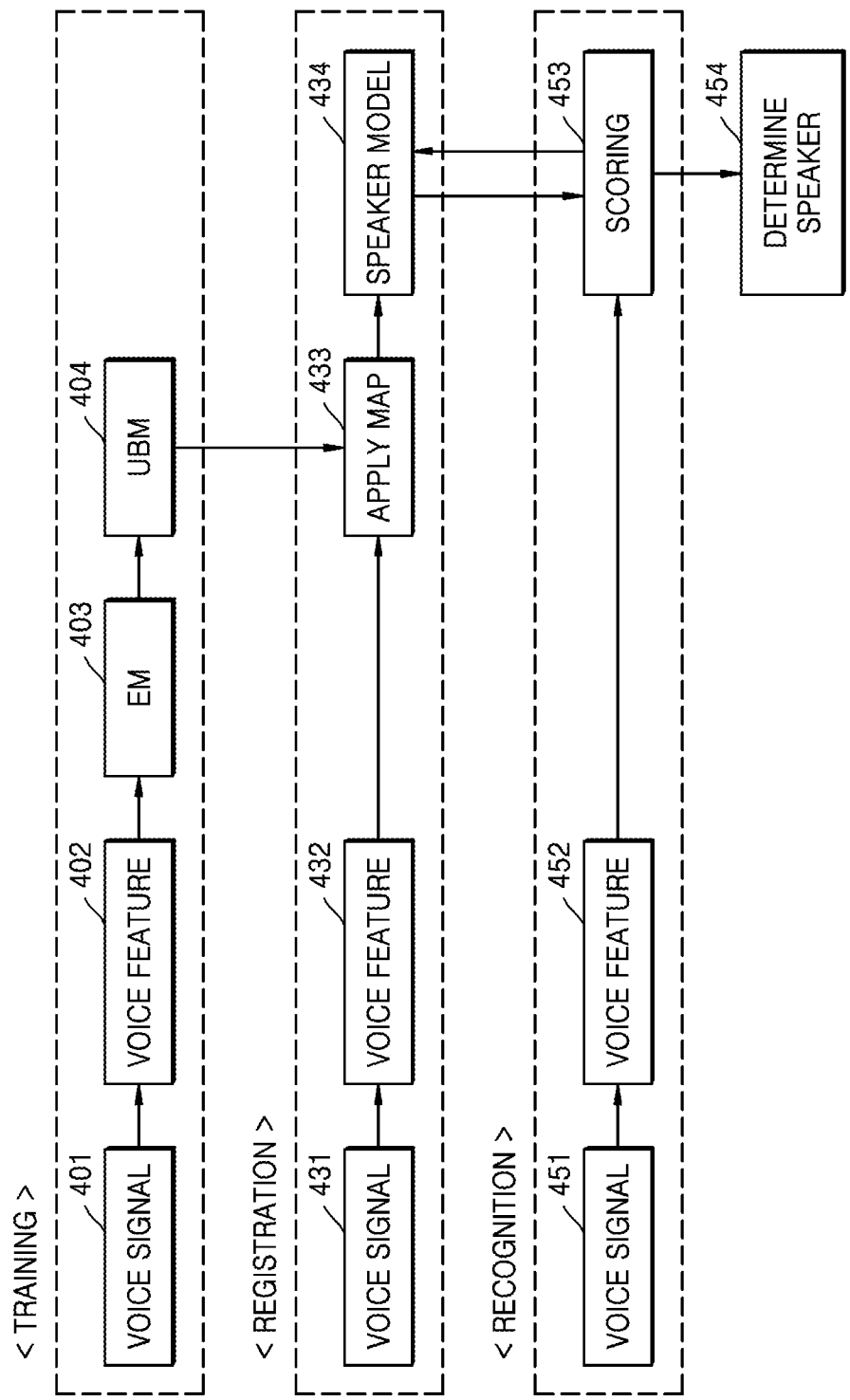
FIG. 4 illustrates a training, registration, and recognition method of an electronic apparatus, according to an embodiment.

FIG. 4 illustrates a training, registration, and recognition method of the electronic apparatus 1000, according to an embodiment of the disclosure.

Referring to FIG. 4, in a training operation, a registration operation, and a recognition operation, the electronic apparatus 1000 may extract voice features 402, 432, and 452 associated with input or received voice signals 401, 431, and 451.

In the training operation, the electronic apparatus 1000 may generate a background speaker model, e.g., a UBM 404, by applying an EM algorithm 403 to the voice feature 402 extracted from the input voice signal 401.

In the registration operation, the electronic apparatus 1000 may generate a GMM. e.g., a speaker model 434, adapted to a user who has uttered, by applying a preset MAP adaptive algorithm 433 to the voice feature 432 extracted from the input voice signal 431 and the background speaker model 404 generated in the training operation.

In the recognition operation, the electronic apparatus 1000 may calculate (operation 453) a similarity score using the voice feature 452 extracted from the input voice signal 451 and the speaker model 434, and perform (operation 454) recognition of the user who has uttered, based on the calculated similarity score.

Figure 5A:
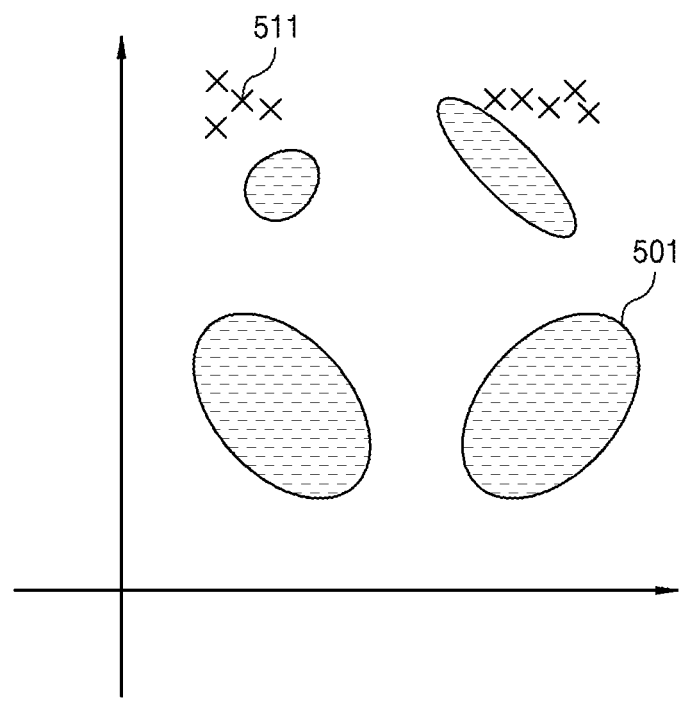
FIG. 5A is a graph illustrating a concept of a Gaussian mixture model (GMM)-universal background model (UBM) scheme used by an electronic apparatus, according to an embodiment.

FIG. 5A is a graph illustrating a distribution of a GMM and a voice feature distribution of a speaker for whom training is to be performed, according to an embodiment of the disclosure.

Referring to FIG. 5A, a distribution 501 of a GMM which has been generated by applying an EM algorithm to a background speaker model, i.e., a model generated using voice data of a plurality of speakers, and a distribution 511 of voice features of a user for whom training is to be performed are shown.

Figure 5B:
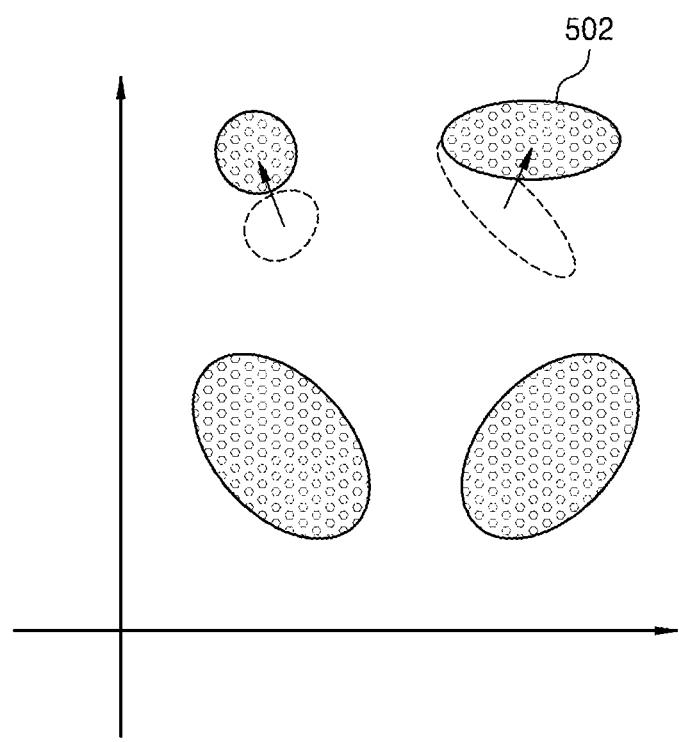
FIG. 5B is a graph illustrating a concept of the GMM-UBM scheme used by an electronic apparatus, according to an embodiment.

FIG. 5B is a graph illustrating a distribution of a GMM after MAP adaptation, according to an embodiment of the disclosure.

Referring to FIG. 5B, for a generated background speaker model, the electronic apparatus 1000 may shift a parameter of the background speaker model using a MAP adaptation algorithm, such that a MAP probability is applied to voice data of a user for whom training is to be performed. As a result of the shifting, a distribution 502 of a GMM for the user for whom training is to be performed may be generated, and this method of generating a GMM may be referred to as a GMM-UBM scheme.

According to the GMM-UBM scheme, when GMMs for several users are obtained, all parameters of the respective GMMs may be obtained via shifting with respect to the same background speaker model, and thus, comparison between every two GMMs is easy.

FIG. 6 is a flowchart of a second registered speaker model learning method of the electronic apparatus 1000, according to some embodiments of the disclosure.

Referring to FIG. 6, according to an embodiment of the disclosure, the electronic apparatus 1000 may receive an input of a first voice signal 601 from the user 10, and obtain first voice data 603 from the input first voice signal 601.

In addition, the electronic apparatus 1000 may receive a second voice signal 602 based on a voice of another person 12, to whom the user 10 is speaking, from an external device, and obtain second voice data 604 from the received second voice signal 602.

The electronic apparatus 1000 may allow a background speaker model 607 generated based on voice signals of a plurality of speakers to be trained using the obtained second voice data 604.

The electronic apparatus 1000 may determine (operation 605) whether the obtained first voice data 603 is voice data corresponding to a first registered speaker associated with the electronic apparatus 1000.

The electronic apparatus 1000 may determine (operation 605) whether the first voice data 603 is voice data corresponding to the first registered speaker associated with the electronic apparatus 1000, by, for example, receiving separate data for authentication from the user 10.

The electronic apparatus 1000 may determine (operation 605) whether the first voice data 603 is voice data corresponding to the first registered speaker, by, as another example, performing voice recognition based on a preset first registered speaker model.

Based on determining that the first voice data 603 is voice data corresponding to the first registered speaker associated with the electronic apparatus 1000, the electronic apparatus 1000 may allow a first registered speaker model 608 to be trained using the first voice data 603 and the background speaker model 607.

Alternatively, based on determining that the first voice data 603 is not voice data corresponding to the first registered speaker registered in the electronic apparatus 1000, the electronic apparatus 1000 may allow the background speaker model 607 generated based on the voice signals of the plurality of speakers to be trained using the first voice data 603 in the same manner as in the case of the second voice data 604.

In addition, the electronic apparatus 1000 may determine (operation 606) whether the obtained first voice data 603 is voice data corresponding to a second registered speaker associated with the electronic apparatus 1000.

The electronic apparatus 1000 may determine (operation 606) whether the first voice data 603 is voice data corresponding to the second registered speaker associated with the electronic apparatus 1000, by, for example, receiving separate data for authentication from the user 10.

The electronic apparatus 1000 may determine (operation 606) whether the first voice data 603 is voice data corresponding to the second registered speaker, by, as another example, performing voice recognition based on a preset second registered speaker model.

Based on determining that the first voice data 603 is voice data corresponding to the second registered speaker associated with the electronic apparatus 1000, the electronic apparatus 1000 may allow a second registered speaker model 609 to be trained using the first voice data 603 and the background speaker model 607.

Alternatively, based on determining that the first voice data 603 is not voice data corresponding to the second registered speaker associated with the electronic apparatus 1000, the electronic apparatus 1000 may allow the background speaker model 607 generated based on the voice signals of the plurality of speakers to be trained using the first voice data 603 in the same manner as in the case of the second voice data 604.

That is, even when the electronic apparatus 1000 is owned by a first user but is provided to a second user, the electronic apparatus 1000 may determine, as voice data corresponding to a second registered speaker, first voice data extracted from a first voice signal input from the second user.

FIG. 6 shows parallel operations of determining (operation 605) whether the first voice data 603 is voice data corresponding to the first registered speaker and determining (operation 606) whether the first voice data 603 is voice data corresponding to the second registered speaker, but the operations of determining (operation 605) and determining (operation 606) may be simultaneously or sequentially performed, and it will be readily understood by those of ordinary skill in the art that the method of FIG. 6 could be applied in the same manner to situations where a plurality of, e.g., n, registered speakers are present.

As described above, the electronic apparatus 1000 according to an embodiment of the disclosure may more efficiently obtain voice data for background speaker model training with respect to a plurality of users of the electronic apparatus 1000 by using voice data obtained via a first channel for the background speaker model training based on determining that the obtained voice data is voice data of any one of a plurality of registered speakers.

Particularly, the method of FIG. 6 according to an embodiment of the disclosure may be applied in the same manner not only in a case where a user of the electronic apparatus 1000 is not an owner of the electronic apparatus 1000 but also in a case of a multi-voice call in which voices of a plurality of users are input simultaneously or sequentially via a microphone, and thus, the electronic apparatus 1000 according to an embodiment of the disclosure may more efficiently obtain voice data for background speaker model training with respect to a plurality of users.

Figure 7:
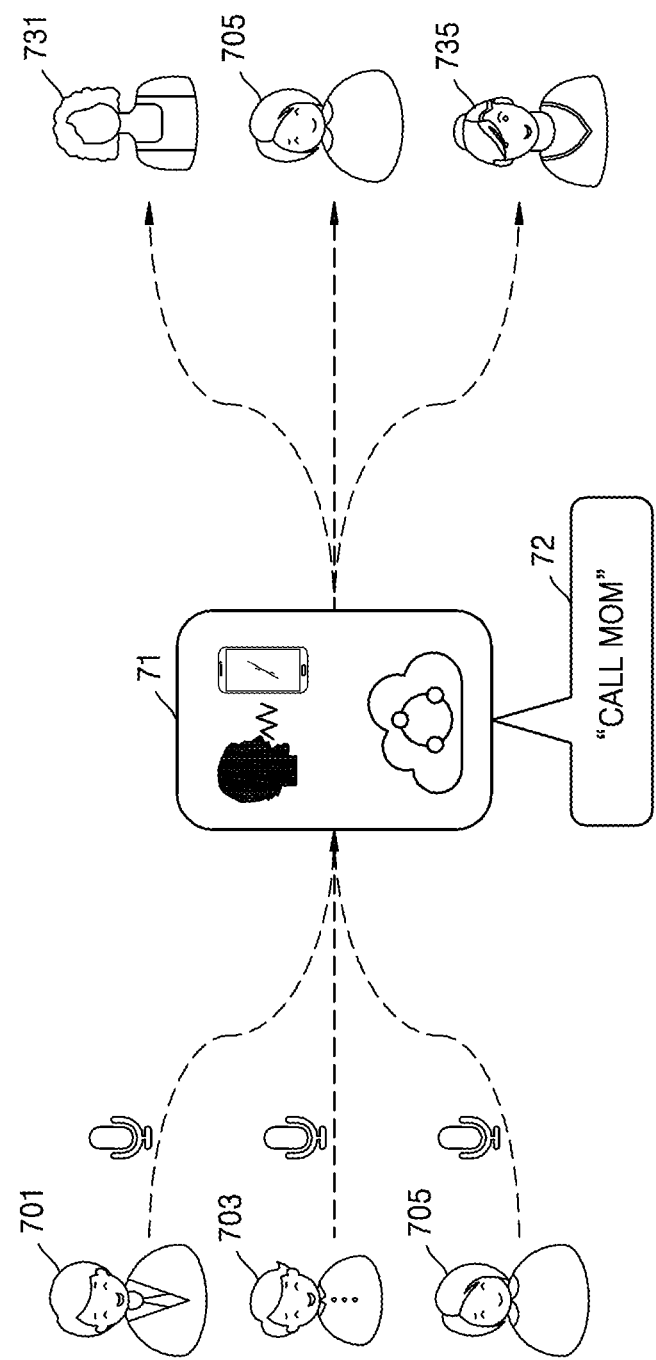
FIG. 7 illustrates a voice command process of an electronic apparatus, according to an embodiment.

FIG. 7 illustrates a voice command process of the electronic apparatus 1000, according to an embodiment of the disclosure.

Referring to FIG. 7, the electronic apparatus 1000 may use registered speaker models corresponding to a plurality of users including a father 701, a son 703, and a mother 705. For example, all of the father 701, the son 703, and the mother 705 may input an input voice signal corresponding to the same command sentence 72 such as "call mom" to the electronic apparatus 1000. The input voice signal may be processed (operation 71) by the electronic apparatus 1000 and/or a server and used to perform an operation corresponding to user authentication and a voice command.

In this case, the electronic apparatus 1000 may perform an appropriate particular function corresponding to each respective user by identifying a registered speaker model corresponding to each respective user from the input voice signal corresponding to the same command sentence 72 input by each respective user, and analyzing information associated with each respective user included in the respective detected registered speaker models.

For example, the electronic apparatus 1000 may obtain voice data from an input voice signal input by the father 701, and compare the obtained voice data with a registered speaker model corresponding to the father 701. As a result of the comparison, when it is determined that the input voice signal is input by the father 701, the electronic apparatus 1000 may determine that authentication of the father 701 is successful, and obtain information (e.g., a phone number) of a mother 731 of the father 701 from the registered speaker model corresponding to the father 701. Upon obtaining the information of the mother 731 of the father 701, the electronic apparatus 1000 may perform a voice call request function to the mother 731 of the father 701 in response to the input voice signal of the father 701.

As another example, the electronic apparatus 1000 may obtain voice data from an input voice signal input by the son 703, and compare the obtained voice data with a registered speaker model corresponding to the son 703. As a result of the comparison, when it is determined that the input voice signal is input by the son 703, the electronic apparatus 1000 may determine that authentication of the son 703 is successful, and obtain information of the mother 705 of the son 703 from the registered speaker model corresponding to the son 703. Upon obtaining the information of the mother 705, the electronic apparatus 1000 may perform a voice call request function to the mother 705 in response to the input voice signal of the son 703.

As another example, the electronic apparatus 1000 may obtain voice data from an input voice signal input by the mother 705, and compare the obtained voice data with a registered speaker model corresponding to the mother 705. As a result of the comparison, when it is determined that the input voice signal is input by the mother 705, the electronic apparatus 1000 may determine that authentication of the mother 705 is successful, and obtain information of mother 735 of the mother 705 from the registered speaker model corresponding to the mother 705. Upon obtaining the information of the mother 735 of the mother 705, the electronic apparatus 1000 may perform a voice call request function to the mother 735 of the mother 705 in response to the input voice signal of the mother 705.

Figure 8:
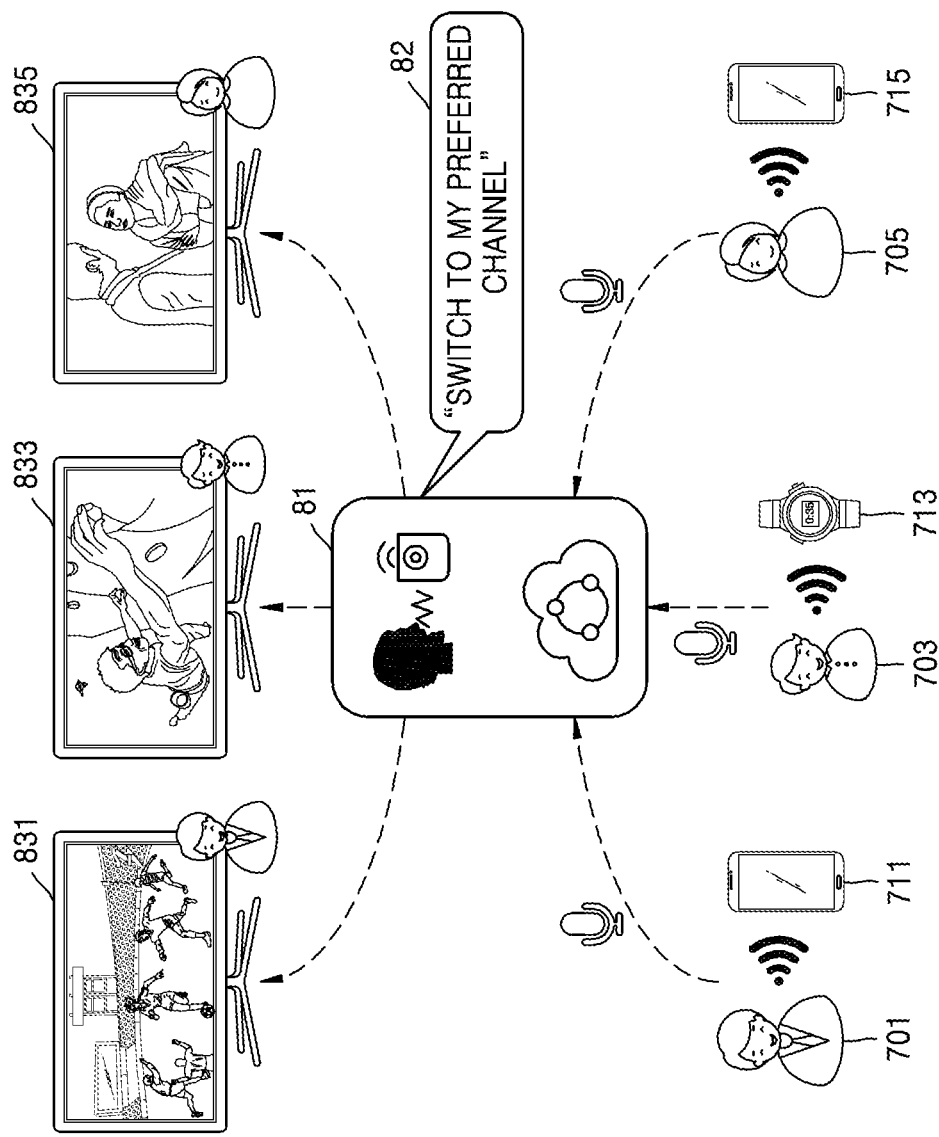
FIG. 8 illustrates a voice command process of an electronic apparatus, according to an embodiment.

FIG. 8 illustrates a voice command process of the electronic apparatus 1000, according to an embodiment of the disclosure;

Referring to FIG. 8, and as similar to FIG. 7, the electronic apparatus 1000 may use registered speaker models of a plurality of users including the father 701, the son 703, and the mother 705. However, in contrast to FIG. 7, the electronic apparatus 1000 of FIG. 8 according to an embodiment of the disclosure corresponds to a smart TV, and in this case, the electronic apparatus 1000 may receive the registered speaker models of the plurality of users from an external device.

That is, like the smart TV, when the electronic apparatus 1000 is not a device using voice signals of a user and a voice call counterpart, the electronic apparatus 1000 may perform an operation corresponding to user authentication and a voice command even without directly training the registered speaker models by receiving the registered speaker models of the plurality of users, which have been generated by external devices, e.g., first, second, and third external devices 711, 713, and 715, using voice signals of a user and a voice call counterpart, from the first, second, and third external devices 711, 713, and 715.

For example, all of the father 701, the son 703, and the mother 705 may input an input voice signal corresponding to the same command sentence 82 such as "switch to my preferred channel" to the electronic apparatus 1000. The input voice signal may be processed (operation 81) by the electronic apparatus 1000 and/or a server, and may be used to perform an operation corresponding to user authentication and a voice command.

In this case, the electronic apparatus 1000 may perform an appropriate particular function corresponding to each respective user by detecting a respective registered speaker model corresponding to each respective user from the respective input voice signals corresponding to the same command sentence 82 input by each respective user and analyzing information associated with each respective user included in the respective detected registered speaker models.

For example, the electronic apparatus 1000 may obtain voice data from an input voice signal input by the father 701, and compare the obtained voice data with a registered speaker model corresponding to the father 701. The registered speaker model corresponding to the father 701 may be, for example, a registered speaker model received from the first external device 711 associated with the father 701. As a result of the comparison, when it is determined that the input voice signal is input by the father 701, the electronic apparatus 1000 may determine that authentication of the father 701 is successful, and obtain information identifying a preferred channel 831 of the father 701 from the registered speaker model corresponding to the father 701. Upon obtaining the information identifying the preferred channel 831 of the father 701, the electronic apparatus 1000 may perform a function of switching a channel of the electronic apparatus 1000 to a sports channel that is the preferred channel 831 of the father 701 in response to the input voice signal of the father 701.

As another example, the electronic apparatus 1000 may obtain voice data from an input voice signal input by the son 703, and compare the obtained voice data with a registered speaker model corresponding to the son 703. The registered speaker model corresponding to the son 703 may be, for example, a registered speaker model received from the second external device 713 associated with the son 703. As a result of the comparison, when it is determined that the input voice signal is input by the son 703, the electronic apparatus 1000 may determine that authentication of the son 703 is successful, and obtain information identifying a preferred channel 833 of the son 703 from the registered speaker model corresponding to the son 703. Upon obtaining the information identifying the preferred channel 833 of the son 703, the electronic apparatus 1000 may perform a function of switching the channel of the electronic apparatus 1000 to an animation channel that is the preferred channel 833 of the son 703 in response to the input voice signal of the son 703.

As another example, the electronic apparatus 1000 may obtain voice data from an input voice signal input by the mother 705, and compare the obtained voice data with a registered speaker model corresponding to the mother 705. The registered speaker model corresponding to the mother 705 may be, for example, a registered speaker model received from the third external device 715 associated with the mother 705. As a result of the comparison, when it is determined that the input voice signal is input by the mother 705, the electronic apparatus 1000 may determine that authentication of the mother 705 is successful, and obtain information identifying a preferred channel 835 of the mother 705 from the registered speaker model corresponding to the mother 705. Upon obtaining the information identifying the preferred channel 835 of the mother 705, the electronic apparatus 1000 may perform a function of switching the channel of the electronic apparatus 1000 to a drama channel that is the preferred channel 835 of the mother 705 in response to the input voice signal of the mother 705.

Figure 9:
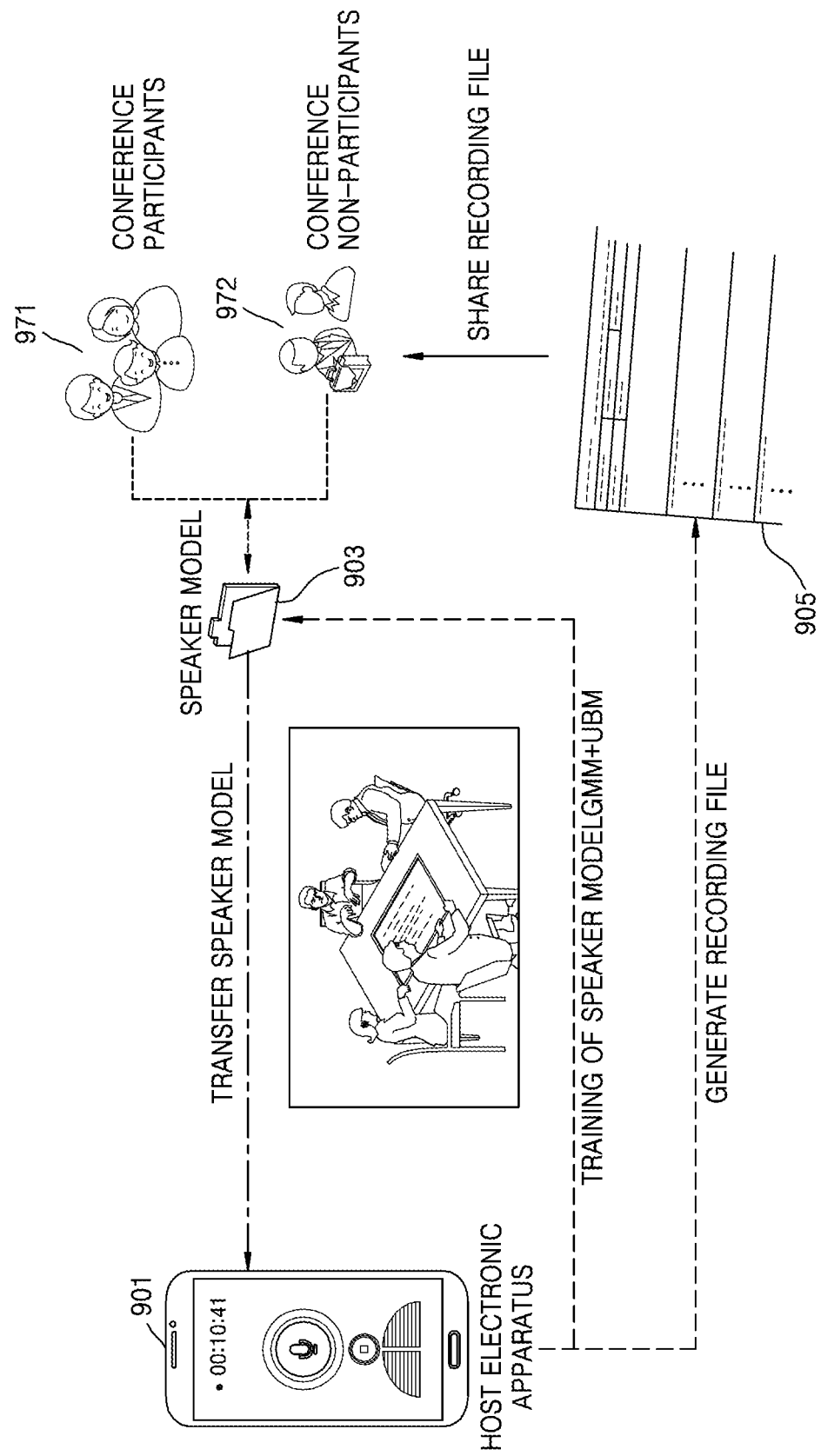
FIG. 9 is a flowchart of a voice processing method of a host electronic apparatus, according to an embodiment.

FIG. 9 is a flowchart of a voice processing method of a host electronic apparatus 901, according to an embodiment of the disclosure.

Referring to FIG. 9, an operation method of an electronic apparatus according to an embodiment of the disclosure may be performed by the host electronic apparatus 901. The host electronic apparatus 901 is an electronic apparatus capable of generating a recording file of voice signals input while a plurality of speakers are performing a conference, and capable of training speaker models respectively corresponding to the plurality of speakers.

Before the conference, respective devices of conference participants 971 may share (operation 903) registered speaker models of the conference participants 971 with the host electronic apparatus 901 and devices of conference non-participants 972. The host electronic apparatus 901 which has received the registered speaker models from the respective devices of the conference participants 971 may train (e.g., update) each registered speaker model in a GMM-UBM scheme based on voices input during the progress of a conference. The registered speaker models that have been trained may be re-shared among the host electronic apparatus 901, the devices of the conference participants 971, and the devices of the conference non-participants 972.

The host electronic apparatus 901 may generate a recording file 905 with respect to the voice signals input during the progress of the conference and share the generated recording file 905 with the devices of the conference non-participants 972. After the conference ends, the devices of the conference non-participants 972 that have received the generated recording file 905 may also train each registered speaker model in the GMM-UBM scheme based on voice signals included in the received recording file 905.

As described above, an electronic apparatus according to an embodiment of the disclosure may allow a registered speaker model to be more efficiently trained without limitations of times and places at which utterances of a user occurs by sharing registered speaker models of a plurality of users.

Figure 10:
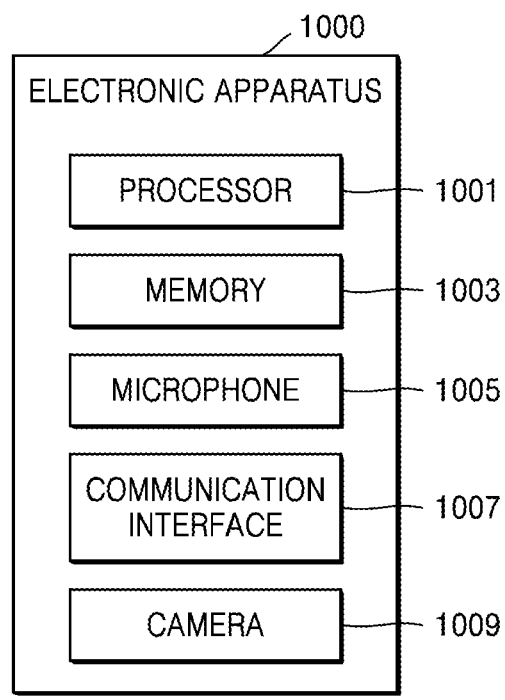
FIG. 10 is a block diagram of an electronic apparatus according to an embodiment.

FIG. 10 is a block diagram of the electronic apparatus 1000 according to an embodiment of the disclosure.

Referring to FIG. 10, the electronic apparatus 1000 according to an embodiment of the disclosure may include a processor 1001, a memory 1003, a microphone 1005, a communication interface 1007, and a camera 1009.

The electronic apparatus 1000 may include, for example, at least one processor 1001.

The processor 1001 may commonly control a general operation of the electronic apparatus 1000. For example, the processor 1001 may generally control the memory 1003, the microphone 1005, the communication interface 1007, and the camera 1009 by executing programs stored in the memory 1003.

The processor 1001 may receive a first voice signal via a first channel and receive a second voice signal via a second channel that is different than the first channel.

For example, the processor 1001 may receive the first voice signal via the microphone 1005, and receive the second voice signal from an external device via the communication interface 1007. The processor 1001 may obtain first voice data from the first voice signal, and obtain second voice data from the second voice signal.

The processor 1001 may allow a background speaker model generated based on voice signals of a plurality of speakers to be trained based on the second voice data.

The processor 1001 may determine whether the first voice data is voice data corresponding to a first registered speaker associated with the electronic apparatus 1000.

When the first voice data is voice data corresponding to the first registered speaker, the processor 1001 may allow a first registered speaker model that is configured to recognize a voice of the first registered speaker to be trained based on the first voice data and the background speaker model.

The processor 1001 may, for example, extract a feature vector from the first voice data, and allow the first registered speaker model to be trained based on a MAP adaptation algorithm using the extracted feature vector and the background speaker model.

Alternatively, when the first voice data is not voice data corresponding to the first registered speaker, the processor 1001 may allow the first registered speaker model to be trained based on the first voice data.

In addition, the processor 1001 may determine whether the first voice data is voice data corresponding to a second registered speaker associated with the electronic apparatus 1000.

When the first voice data is voice data corresponding to the second registered speaker, the processor 1001 may allow a second registered speaker model that is configured to recognize a voice of the second registered speaker to be trained based on the first voice data and the background speaker model.

Alternatively, when the first voice data is not voice data corresponding to the second registered speaker, the processor 1001 may allow the background speaker model to be trained based on the first voice data.

The memory 1003 may store programs for controlling an operation of the electronic apparatus 1000. The memory 1003 may include at least one instruction for controlling an operation of the electronic apparatus 1000. The memory 1003 may store, for example, a voice signal input by a user, a registered speaker model including information of a user feature vector corresponding to a certain user, an acoustic model that is configured to extract voice data according to utterance of the user from the voice signal, voice data extracted from the voice signal, a background speaker model, and the like. The programs stored in the memory 1003 may be classified into a plurality of modules according to functions thereof.

The memory 1003 may include at least one type of storage medium among a flash memory type memory, a hard disk type memory, a multimedia card micro type memory, a card type memory (e.g., a secure digital (SD) or extreme digital (XD) memory), random access memory (RAM), static RAM (SRAM), read only memory (ROM), electrically erasable programmable ROM (EEPROM), PROM, a magnetic memory, a magnetic disc, and an optical disc.

The microphone 1005 may receive an input voice signal from the user. The microphone 1005 may receive an input voice signal corresponding to a real-time user voice from the surroundings of the electronic apparatus 1000 during an operation of the electronic apparatus 1000.

The communication interface 1007 may receive a voice signal from an external device. The communication interface 1007 may receive a real-time voice signal generated by another person that is speaking to the user from the external device during an operation of the electronic apparatus 1000.

The communication interface 1007 may include one or more communication modules for communication with a server. For example, the communication interface 1007 may include a short-range wireless communication interface and a mobile communication interface. The short-range wireless communication interface may include a Bluetooth communication interface, a Bluetooth low energy (BLE) communication interface, a near field communication (NFC) interface, a wireless local area network (WLAN) (Wi-Fi) communication interface, a Zigbee communication interface, an infrared data association (IrDA) communication interface, a Wi-Fi Direct (WFD) communication interface, an ultra-wideband (UWB) communication interface, an Ant+ communication interface, and the like, but is not limited thereto.

The camera 1009 may obtain a user facial image by photographing the face of the user of the electronic apparatus 1000. The camera 1009 may, for example, obtain a real-time user facial image for user authentication during operation of the electronic apparatus 1000.

Figure 11:
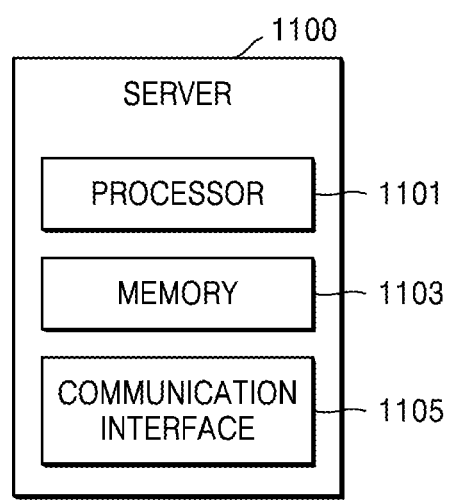
FIG. 11 is a block diagram of a server according to an embodiment.

FIG. 11 is a block diagram of a server 1100 according to an embodiment of the disclosure.

A user authentication method according to an embodiment of the disclosure may be performed by the electronic apparatus 1000 and/or the server 1100 connected to the electronic apparatus 1000 via wired or wireless communication.

Referring to FIG. 11, the server 1100 according to an embodiment of the disclosure may include a processor 1101, a communication interface 1105, and a memory 1103. The server 1100 may not directly receive data required for user authentication from a user, and may receive a registered speaker model, an obtained voice signal, voice data, and the like from the electronic apparatus 1000 to perform user authentication and/or training of the registered speaker model.

The memory 1103 may store programs for controlling an operation of the server 1100. The memory 1103 may include at least one instruction for controlling an operation of the server 1100. The memory 1103 may store, for example, a voice signal input by the user, a registered speaker model including information associated with a user feature vector corresponding to a certain user, an acoustic model that is configured to extract voice data according to an utterance of the user from the voice signal, voice data extracted from the voice signal, a background speaker model, and the like. The programs stored in the memory 1103 may be classified into a plurality of modules according to functions thereof.

The memory 1103 may include a plurality of databases (DBs) so as to integrally manage registered speaker models of a plurality of users, data of a plurality of electronic apparatuses, and the like.

The communication interface 1105 may include one or more communication modules for communication with the electronic apparatus 1000. For example, the communication interface 1105 may include a short-range wireless communication interface and a mobile communication interface. The short-range wireless communication interface may include a Bluetooth communication interface, a BLE communication interface, an NFC interface, a WLAN (Wi-Fi)

communication interface, a Zigbee communication interface, an IrDA communication interface, a WFD communication interface, a UWB communication interface, an Ant+ communication interface, and the like, but is not limited thereto. The mobile communication interface transmits and receives a wireless signal to and from at least one of a base station, an external terminal, or a server in a mobile communication network. Herein, the wireless signal may include various types of data according to transmission and reception of a voice call signal, a video call signal, or a text/multimedia message.

The server 1100 may include, for example, at least one processor 1101.

The processor 1101 may commonly control a general operation of the server 1100. For example, the processor 1101 may control the memory 1103 and the communication interface 1105 by executing programs stored in the memory 1103.

The processor 1101 of the server 1100 may perform the same operation as the processor 1001 of the electronic apparatus 1000 of FIG. 10 according to an embodiment of the disclosure, and accordingly, in the disclosure, a description of the operation of the processor 1101 is omitted. However, it will be easily understood by those of ordinary skill in the art that each operation of the operation method of the electronic apparatus 1000 in the disclosure may be performed by at least one of the processor 1001 of the electronic apparatus 1000 or the processor 1101 of the server 1100 with respect to the same voice signal, voice data, background speaker model, and registered speaker model.

According to an electronic apparatus and an operation method thereof of the disclosure, voice data obtained through voice calls of a user may be used for training to reduce the user's burden of inputting voice data and to improve user experience.

An embodiment of the disclosure may be implemented in a form of a recording medium including computer-executable instructions such as a program module executed by a computer system. A non-transitory computer-readable medium may be an arbitrary available medium which may be accessed by a computer system and includes all types of volatile and non-volatile media and separated and non-separated media. In addition, the non-transitory computer-readable medium may include all types of computer storage media and communication media. The computer storage media include all types of volatile and non-volatile and separated and non-separated media implemented by an arbitrary method or technique for storing information such as computer-readable instructions, a data structure, a program module, or other data.

In addition, in the present specification, "unit or interface" may indicate a hardware component such as a processor or a circuit and/or a software component executed by a hardware component such as a processor.

The embodiments of the disclosure described above are only illustrative, and it will be understood by those of ordinary skill in the art that various changes in form and details may be made therein without changing the technical scope and features of the disclosure. Therefore, the embodiments of the disclosure should be understood in the illustrative sense only and not for the purpose of limitation in all aspects. For example, each component described as a single type may be carried out by being distributed, and likewise, components described as a distributed type may also be carried out by being coupled.

It should be understood that embodiments of the disclosure described herein should be considered in a descriptive sense only and not for purposes of limitation. Descriptions of features or aspects within each embodiment of the disclosure should typically be considered as available for other similar features or aspects in other embodiments of the disclosure.

While one or more embodiments of the disclosure have been described with reference to the figures, it will be understood by those of ordinary skill in the art that various changes in form and details may be made therein without departing from the spirit and scope as defined by the following claims.

What is claimed is:

1. A method of processing voice data, the method comprising:
obtaining first voice data based on a first voice signal received via a first channel of an electronic apparatus;
obtaining second voice data based on a second voice signal received via a second channel of the electronic apparatus;
allowing a background speaker model that is generated based on voice signals of a plurality of speakers to be trained based on the second voice data;
determining whether the first voice data is voice data corresponding to a first registered speaker associated with the electronic apparatus, based on facial recognition using an image captured via a camera or fingerprint recognition using a fingerprint recognition sensor; and
allowing a first registered speaker model that is configured to recognize a voice of the first registered speaker to be trained based on the first voice data and the background speaker model, based on determining that the first voice data is voice data corresponding to the first registered speaker.

2. The method of claim 1, further comprising:
receiving the first voice signal via a microphone of the electronic apparatus; and
receiving the second voice signal from an external device via a communication interface.

3. The method of claim 1, further comprising:
receiving a third registered speaker model that is configured to recognize the voice of the first registered speaker from an external device; and
performing voice recognition of the first registered speaker using the first registered speaker model and the third registered speaker model.

4. The method of claim 1, further comprising:
allowing the background speaker model to be trained based on the first voice data, based on determining that the first voice data is not voice data corresponding to the first registered speaker.

5. The method of claim 1, further comprising:
receiving a speaker registration voice signal generated through an utterance of a preset sentence; and
pre-registering the first registered speaker associated with the electronic apparatus using the speaker registration voice signal.

6. The method of claim 5, wherein the determining of whether the first voice data is voice data corresponding to the first registered speaker associated with the electronic apparatus comprises determining whether the first voice data is voice data corresponding to the first registered speaker, based on performing voice recognition using the first registered speaker model.

7. The method of claim 1, wherein the allowing of the first registered speaker model that is configured to recognize the voice of the first registered speaker comprises:

extracting a feature vector corresponding to the first voice data; and allowing the first registered speaker model to be trained based on a maximum a posteriori (MAP) adaptation algorithm using the feature vector and the background speaker model.

8. The method of claim 1, further comprising:

determining whether the first voice data is voice data corresponding to a second registered speaker associated with the electronic apparatus; and allowing a second registered speaker model that is configured to recognize a voice of the second registered speaker to be trained based on the first voice data and the background speaker model, based on determining that the first voice data is voice data corresponding to the second registered speaker.

9. An electronic apparatus for processing voice data, comprising:

a memory configured to store one or more instructions; and a processor configured to execute the one or more instructions to:

obtain first voice data based on a first voice signal received via a first channel;

obtain second voice data based on a second voice signal received via a second channel;

allow a background speaker model that is generated based on voice signals of a plurality of speakers to be trained based on the second voice data;

determine whether the first voice data is voice data corresponding to a first registered speaker associated with the electronic apparatus, based on facial recognition using an image captured via a camera or fingerprint recognition using a fingerprint recognition sensor; and allow a first registered speaker model that is configured to recognize a voice of the first registered speaker to be trained based on the first voice data and the background speaker model, based on determining that the first voice data is voice data corresponding to the first registered speaker.

10. The electronic apparatus of claim 9, wherein the processor is further configured to:

receive a third registered speaker model that is configured to recognize a voice of the first registered speaker from an external device; and perform voice recognition of the first registered speaker using the first registered speaker model and the third registered speaker model.

11. The electronic apparatus of claim 9, wherein the processor is further configured to:

receive the first voice signal via a microphone included in the electronic apparatus; and receive the second voice signal from an external device via a communication interface.

12. The electronic apparatus of claim 9, wherein the processor is further configured to:

determine whether the first voice data is voice data corresponding to the first registered speaker, based on facial recognition using an image captured via a camera or fingerprint recognition using a fingerprint recognition sensor.

13. The electronic apparatus of claim 9, wherein the processor is further configured to:

determine whether the first voice data is voice data corresponding to a second registered speaker associated with the electronic apparatus; and allow a second registered speaker model that is configured to recognize a voice of the second registered speaker to be trained based on the first voice data and the background speaker model, based on determining that the first voice data is voice data corresponding to the second registered speaker.

14. The electronic apparatus of claim 9, wherein the processor is further configured to:

receive a speaker registration voice signal generated through an utterance of a preset sentence; and pre-register the first registered speaker using the speaker registration voice signal.

15. The electronic apparatus of claim 14, wherein the processor is further configured to determine whether the first voice data is voice data corresponding to the first registered speaker, based on voice recognition using the first registered speaker model.

16. The electronic apparatus of claim 9, wherein the processor is further configured to:

extract a feature vector corresponding to the first voice data; and allow the first registered speaker model to be trained based on a maximum a posteriori (MAP) adaptation algorithm using the feature vector and the background speaker model.

* * * * *